(12) United States Patent
Anderson et al.

(10) Patent No.: US 10,915,462 B2
(45) Date of Patent: Feb. 9, 2021

(54) DESTAGING PINNED RETRYABLE DATA IN CACHE

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/452,420

(22) Filed: Jun. 25, 2019

(65) Prior Publication Data
US 2019/0310950 A1    Oct. 10, 2019

Related U.S. Application Data

(63) Continuation of application No. 15/680,732, filed on Aug. 18, 2017, now Pat. No. 10,372,624.

(51) Int. Cl.
*G06F 12/12* (2016.01)
*G06F 12/126* (2016.01)
*G06F 12/0891* (2016.01)
*G06F 12/0895* (2016.01)
*G06F 12/0842* (2016.01)
(Continued)

(52) U.S. Cl.
CPC ........ *G06F 12/126* (2013.01); *G06F 12/0842* (2013.01); *G06F 12/0846* (2013.01);
(Continued)

(58) Field of Classification Search
CPC ............. G06F 12/0804; G06F 12/0868; G06F 12/0891; G06F 12/0895; G06F 12/126;
(Continued)

(56) References Cited

U.S. PATENT DOCUMENTS

| 5,437,022 A | 7/1995 | Beardsley et al. |
| 7,266,653 B2 | 9/2007 | Tross et al. |

(Continued)

OTHER PUBLICATIONS

List of IBM Patents or Patent Applications Treated as Related, Jun. 25, 2019, 2 pp. [18.727C1 (Appendix P)].
(Continued)

*Primary Examiner* — Gary J Portka
(74) *Attorney, Agent, or Firm* — Konrad Raynes Davda & Victor LLP; Janaki K. Davda (57) ABSTRACT

Provided are techniques for destaging pinned retryable data in cache. A ranks scan structure is created with an indicator for each rank of multiple ranks that indicates whether pinned retryable data in a cache for that rank is destageable. A cache directory is partitioned into chunks, wherein each of the chunks includes one or more tracks from the cache. A number of tasks are determined for the scan of the cache. The number of tasks are executed to scan the cache to destage pinned retryable data that is indicated as ready to be destaged by the ranks scan structure, wherein each of the tasks selects an unprocessed chunk of the cache directory for processing until the chunks of the cache directory have been processed.

20 Claims, 9 Drawing Sheets

(51) Int. Cl.
*G06F 12/0846* (2016.01)
*G06F 12/0868* (2016.01)

(52) U.S. Cl.
CPC ...... *G06F 12/0868* (2013.01); *G06F 12/0891* (2013.01); *G06F 12/0895* (2013.01); *G06F 2212/1024* (2013.01); *G06F 2212/1044* (2013.01); *G06F 2212/154* (2013.01); *G06F 2212/262* (2013.01); *G06F 2212/263* (2013.01); *G06F 2212/282* (2013.01); *G06F 2212/312* (2013.01)

(58) Field of Classification Search
CPC ....... G06F 2212/1044; G06F 2212/154; G06F 2212/282
USPC .......................... 711/129, 133, 135, 144, 145
See application file for complete search history.

(56) References Cited

U.S. PATENT DOCUMENTS

| | | |
|---|---|---|
| 9,075,723 B2 | 7/2015 | Benhase et al. |
| 9,507,527 B2 | 11/2016 | Benhase et al. |
| 9,921,973 B2 * | 3/2018 | Benhase ............. G06F 12/0866 |
| 2003/0204677 A1 | 10/2003 | Bergsten |
| 2008/0040553 A1 | 2/2008 | Ash et al. |
| 2012/0233408 A1 | 9/2012 | Beardsley et al. |
| 2017/0351609 A1 * | 12/2017 | Ash ....................... G06F 12/121 |
| 2019/0057042 A1 | 2/2019 | Anderson et al. |

OTHER PUBLICATIONS

Notice of Allowance 1 for U.S. Appl. No. 15/680,732, 12 pp., dated Mar. 27, 2019. [18.727 (NOA1)].

\* cited by examiner

DESTAGING PINNED RETRYABLE DATA IN CACHE

BACKGROUND

1. Field of the Invention

Embodiments of the invention relate to destaging pinned retryable data in cache.

2. Description of the Related Art

A storage controller is coupled to cache and to storage that is divided into extents. The storage may be a Redundant Array of Independent Disks (RAID) array. Data may initially be stored in cache and then destaged to the extents of the storage (i.e., the data is moved or copied from the cache to the storage).

When data in the storage controller's cache cannot be destaged due to various reasons, the data is pinned retryable in cache (which may also be referred to as "pinned retryable data" or "pinned data"). When the condition clears and data may be destaged, the pinned retryable data is scanned and destaged to storage.

However, when the storage is out of extents (i.e., the extents are full of data and no available space for storing additional data), the data cannot be destaged. In an Extent Space Efficient (ESE) configuration, extents are allocated as needed. In other words, the storage controller is thinly provisioned. Customers may create virtual space that exceeds the physical capacity of the storage. For example, there may be 10 physical extents, but the virtual space may have 15 virtual extents that map to the 10 physical extents. Regardless of how many virtual extents are created, data can only be stored in the 10 physical extents. Thus, this works as long as writes are done below the physical capacity of the storage. If there are more writes then the physical capacity of the storage, then the destages will fail and the data is pinned retryable in cache.

As more extents become available for a RAID array, some of the pinned retryable data in cache may be destaged. A cache scan may be started to destage the pinned retryable data for RAID arrays that have more extents available. However, when and how frequent to start the scans is not trivial. Starting scans every time an extent becomes available may cause too many scans to be running in parallel. Waiting for many extents to become available can cause data that is pinned retryable in cache to consume a lot of cache and may affect performance.

SUMMARY

Provided is a computer program product for destaging pinned retryable data in cache. The computer program product comprises a computer readable storage medium having program code embodied therewith, the program code executable by at least one processor to perform: creating a ranks scan structure with an indicator for each rank of multiple ranks that indicates whether pinned retryable data in a cache for that rank is destageable; partitioning a cache directory into chunks, wherein each of the chunks includes one or more tracks from the cache; determining a number of tasks for the scan of the cache; and executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

Provided is a computer system for destaging pinned retryable data in cache. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: creating a ranks scan structure with an indicator for each rank of multiple ranks that indicates whether pinned retryable data in a cache for that rank is destageable; partitioning a cache directory into chunks, wherein each of the chunks includes one or more tracks from the cache; determining a number of tasks for the scan of the cache; and executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

Provided is a method for destaging pinned retryable data in cache. The method comprises: creating, with a processor of a computer, a ranks scan structure with an indicator for each rank of multiple ranks that indicates whether pinned retryable data in a cache for that rank is destageable; partitioning a cache directory into chunks, wherein each of the chunks includes one or more tracks from the cache; determining a number of tasks for the scan of the cache; and executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments efficiently perform scans of cache to destage pinned retryable data.

Figure 1:
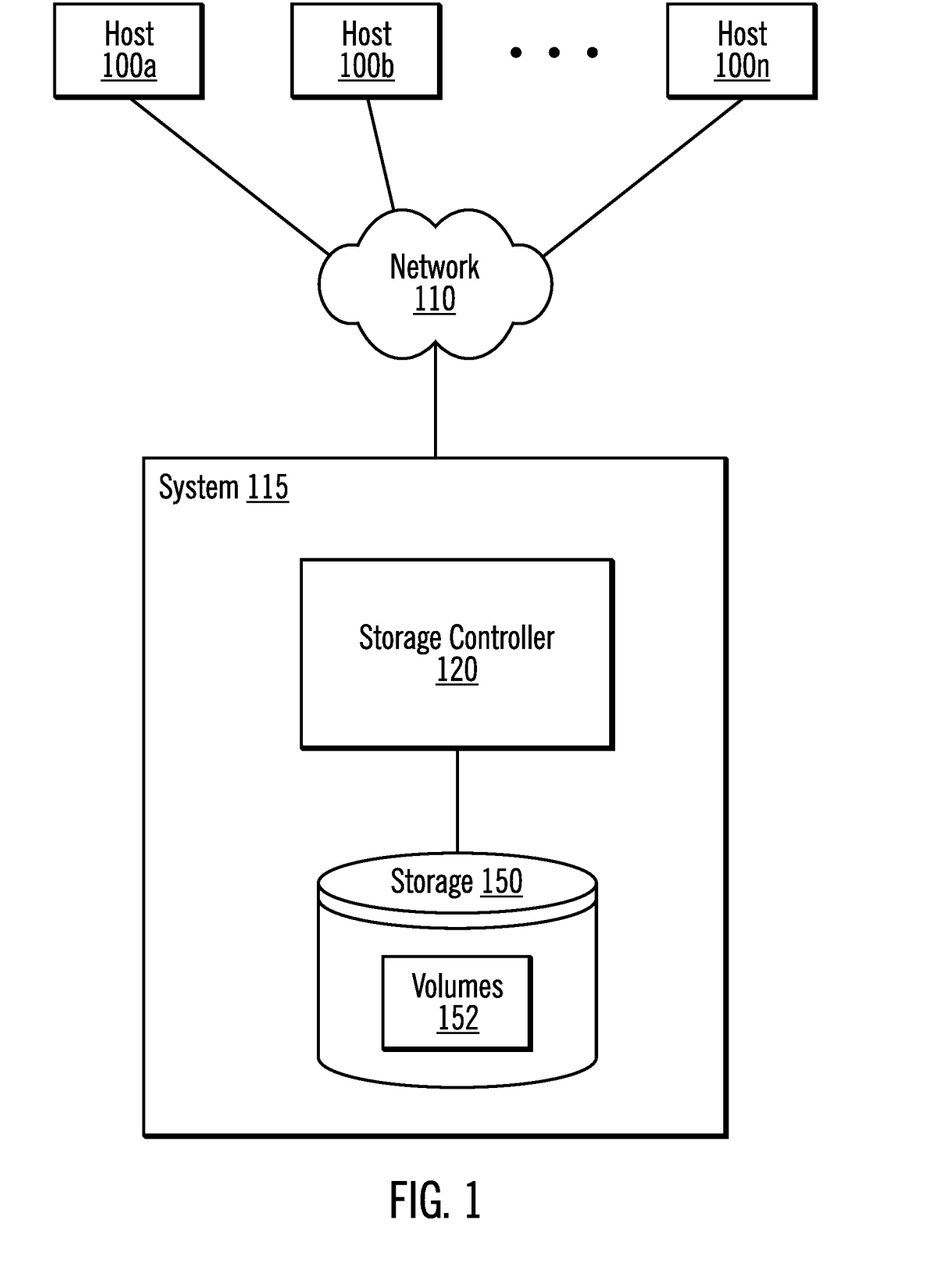
FIG. 1 illustrates, in a block diagram, a computing environment with a storage controller in accordance with certain embodiments.

FIG. 1 illustrates, in a block diagram, a computing environment with a storage controller in accordance with certain embodiments. A plurality of hosts 100a, 100b, . . . 100n are coupled, via a network 110, to a storage controller 120 of a system 115. The plurality of hosts 100a, 100b, . . . 100n may submit Input/Output (I/O) requests to the storage controller (or storage control units) 120 over the network 110 to access data at volumes 152 in storage 150. The volumes may be, for example, Logical Unit Numbers, Logical Devices, Logical Subsystems, etc. The storage 150 may be storage drives.

As noted above, the computing environment includes one or more hosts 100a, 100b, . . . 100n writing updates to the storage controller 120 for storage in the storage 150.

The system components 100a, 100b, . . . 100n, 120, 150, are connected to the network 110 which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the system 115 to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer.

Figure 2:
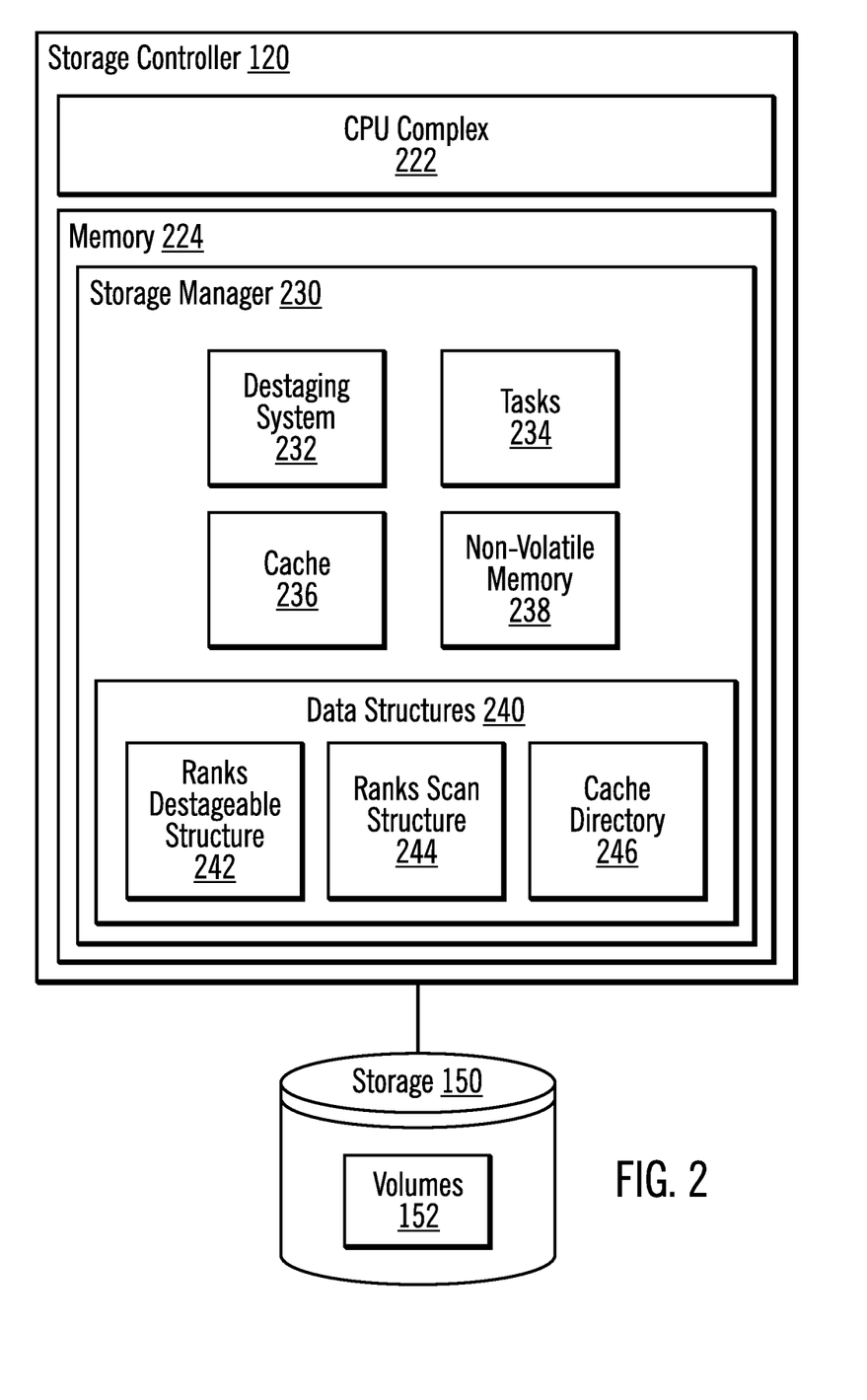
FIG. 2 illustrates, in a block diagram, further details of a storage controller in accordance with certain embodiments.

FIG. 2 illustrates, in a block diagram, further details of a storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an Arithmetic Logic Unit (ALU), Floating Point Unit (FPU), and/or various levels of cache (such as L1 and L2 cache), for example. It is appreciated that a processor core may have other logic elements in addition to or instead of those mentioned herein.

Also, the storage controller 120 includes a memory 224 that includes a storage manager 230 for managing storage operations (e.g., to store data in the storage 150). The storage manager 230 includes a destaging system 232, tasks 234, cache 236, non-volatile memory 238, and data structures 240. The data structures 240 includes a ranks destageable structure 242 (also referred to as a ranks pinned retryable data destageable data structure), a ranks scan structure 244 (also referred to as a ranks running scan data structure), and a cache directory 246. With embodiments, the tasks 234 are Task Control Blocks (TCBs). The TCBs perform the required operations to destage tracks from cache 236 to storage 150.

With embodiments, the storage manager 230, including the destaging system 232, is depicted as software stored in the memory 224 and executed by the CPU complex 222. However, it is appreciated that the logic functions of the storage manager 230 may be implemented as hardware, software, firmware or combinations of one or more thereof, depending upon the particular application.

The storage 150 may include multiple ranks. In certain embodiments, a rank may be described as having multiple extents (e.g., a RAID array having multiple extents). Each extent has multiple tracks for storing data. A group of extents may also be described as forming a volume. As used herein, the term track may refer to a track of a disk storage unit, but may also reference to other units of data (or data units) configured in the storage 150 such as a bit, byte, word, segment, page, block (such as a Logical Block Address (LBA)), etc., which may be a part of a larger grouping of data units, such as those stored collectively as a volume, logical device, etc. of data.

In certain embodiments, the storage 150 may be comprised of one or more sequential access storage devices, such as hard disk drives and magnetic tape or may include non-sequential access storage devices, such as Solid State Drives (SSDs), for example. The storage 150 may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 3:
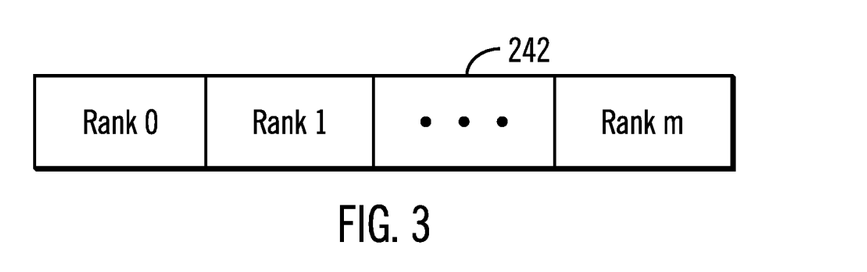
FIG. 3 illustrates details of a ranks destageable structure in accordance with certain embodiments.

FIG. 3 illustrates details of a ranks destageable structure 242 in accordance with certain embodiments. The ranks destageable structure 242 has an indicator (e.g., a bit) for each rank, such as for Rank 0, Rank 1, . . . Rank m. When the indicator is set to a first value (e.g., "1" or true), the indicator indicates that the rank has pinned retryable data in cache that is destageable. When the indicator is set to a second value (e.g., "0" or false), the indicator indicates that the rank does not have pinned retryable data in cache. With embodiments, the pinned retryable data is the data for a track.

With embodiments, the ranks scan structure 244 is a copy of the ranks destageable structure 242 and is used for performing a scan of cache. With embodiments, the ranks destageable structure 242 and the ranks scan structure 244 are bitmaps with bits (as indicators).

Figure 4:
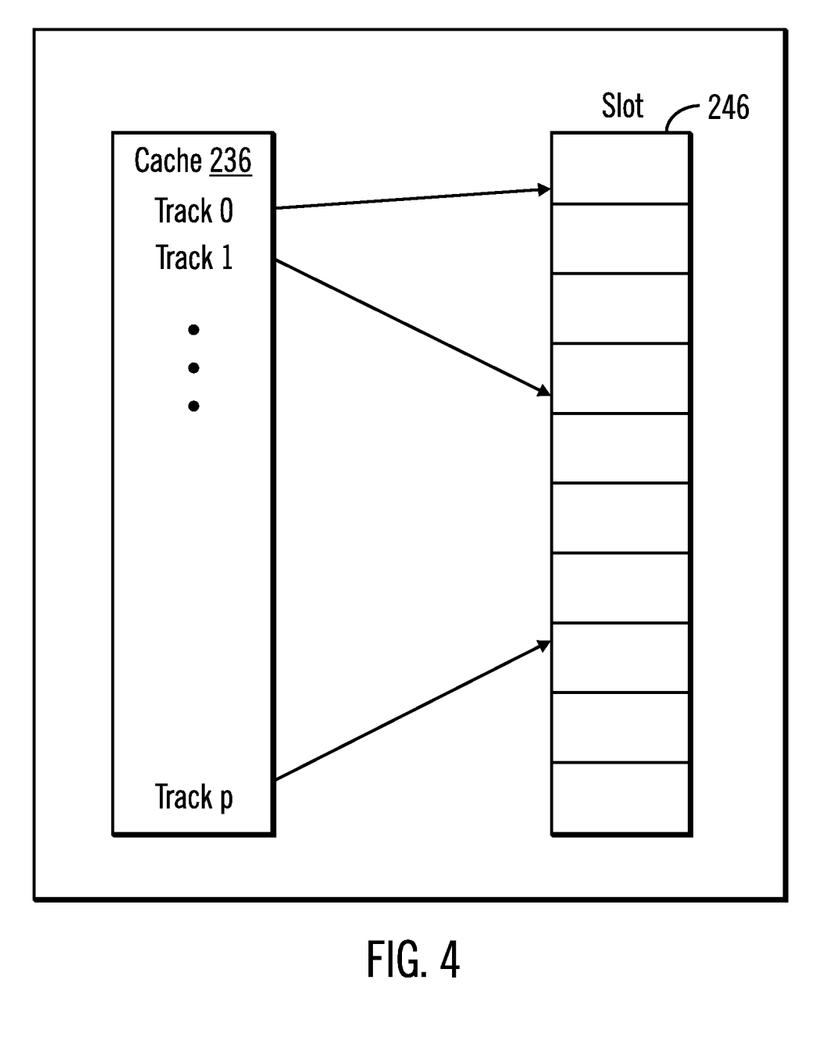
FIG. 4 illustrates details of a cache directory in accordance with certain embodiments.

FIG. 4 illustrates details of a cache directory 246 in accordance with certain embodiments. With embodiments, the cache directory 246 is a hash table of the tracks in cache 236. Each track (Track 0, Track 1, . . . Track P) is hashed into a slot of the cache directory 246. Multiple tracks may be hashed into one slot and linked together.

With embodiments, the destaging system 232 uses the ranks destageable structure 242 to keep track of ranks that need a destage scan. The destaging system 232 runs one scan at a time. The destaging system 232 creates tasks for the scan based on a number of processors and based on a type and number of ranks in the ranks destageable structure 242. The rank type indicates the underlying storage medium and the speed of the rank (e.g., spinning drive and Revolutions Per Minute (RPM), Solid State Drive (SSD), flash memory, etc.).

With embodiments, the destaging system 232 divides the cache directory 246 into chunks and has tasks process one chunk at a time.

Figure 5:
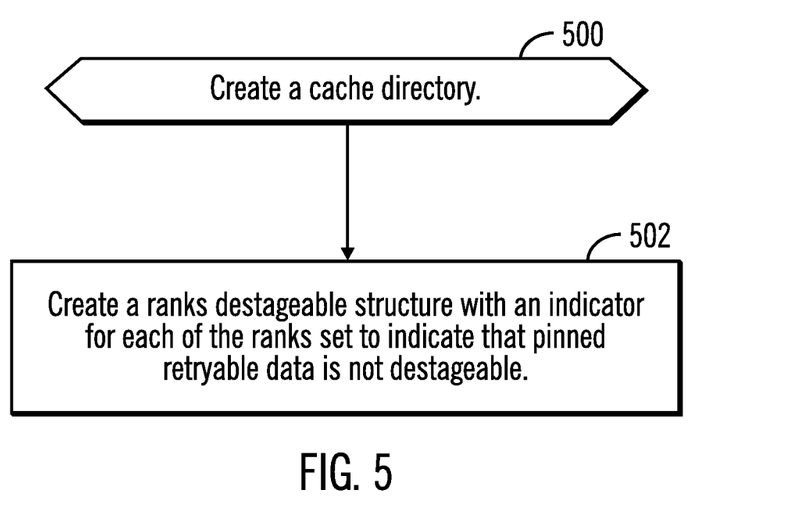
FIG. 5 illustrates, in a flowchart, operations for creating structures in accordance with certain embodiments.

FIG. 5 illustrates, in a flowchart, operations for creating structures in accordance with certain embodiments. Control begins at block 500 with the destaging system 232 creating a cache directory 246. In block 502, the destaging system 232 creates a ranks destageable structure 242 with an indicator for each of the ranks set to indicate that pinned retryable data is not destageable.

With embodiments, the destaging system 232 creates a bitmap of ranks that have pinned retryable data (bitmapRanksPinnedDataDestagable). When a rank has pinned retryable data and its state changes so that pinned retryable data may be destaged, then the destaging system 232 sets a bit for that rank in the bitmap (bitmapRanksPinnedDataDestagable).

Figure 6:
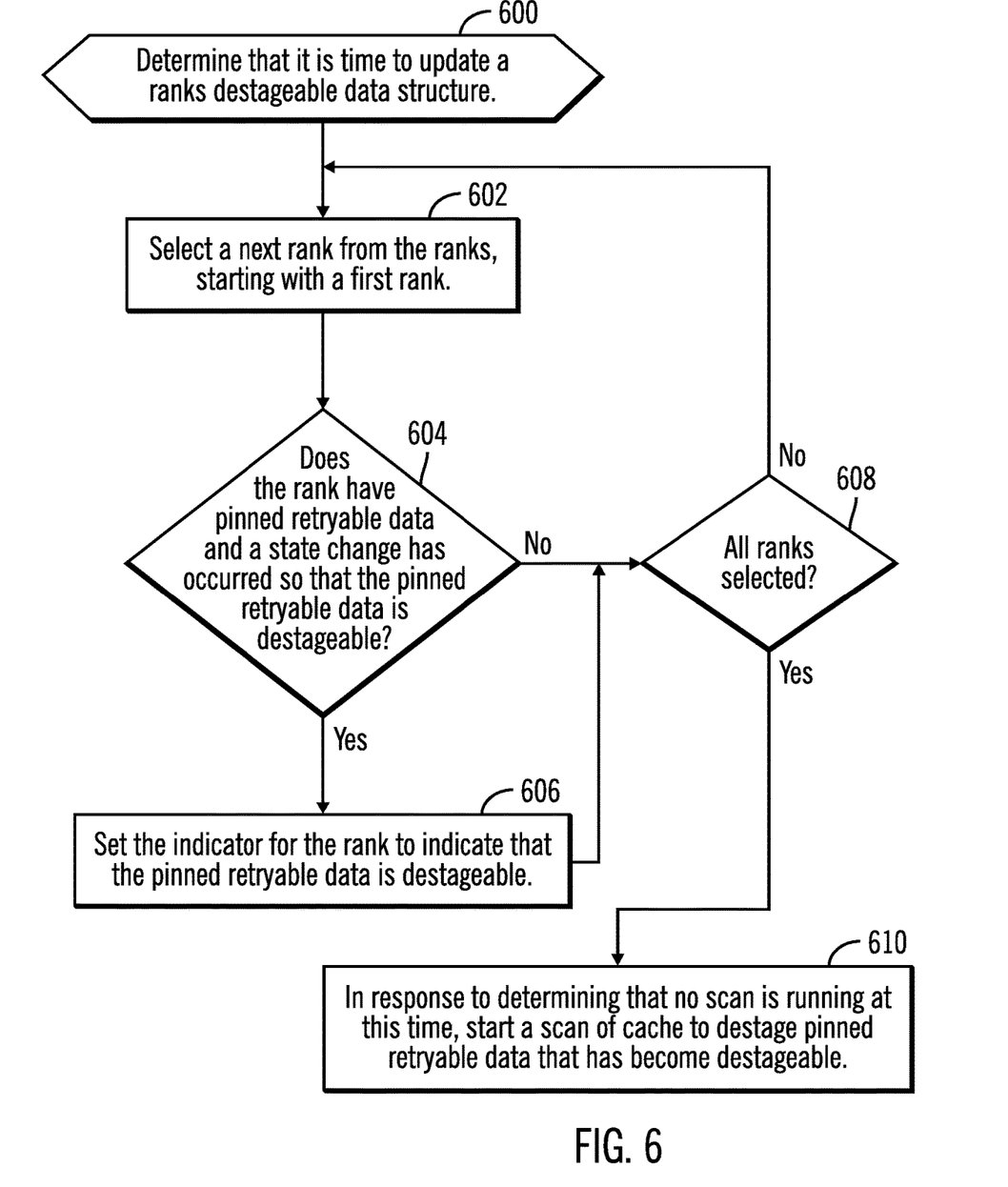
FIG. 6 illustrates, in a flowchart, operations for updating a ranks destageable structure in accordance with certain embodiments.

FIG. 6 illustrates, in a flowchart, operations for updating a ranks destageable structure 242 in accordance with certain embodiments. Control begins at block 600 with the destaging system 232 determining that it is time to update a ranks destageable data structure. In certain embodiments, the destaging system 232 determines that it is time to update a ranks destageable data structure when the destaging system 232 receives notification that a rank has transitioned from a non-destageable state (a pinned retryable state) to a destageable state (e.g., when extents have become available). In certain other embodiments, the destaging system 232 determines that it is time to update a ranks destageable data structure periodically.

In block 602, the destaging system 232 selects a next rank from the ranks, starting with a first rank. In block 604, the destaging system 232 determines whether the rank has pinned retryable data and a state change has occurred so that the pinned retryable data is destageable. If so, processing continues to block 606, otherwise, processing continues to block 608.

In block 606, the destaging system 232 sets the indicator for the rank to indicate that the pinned retryable data is destageable. From block 606, processing continues to block 608. In block 608, the destaging system 232 determines whether all ranks have been selected. If no, processing continues to block 602, otherwise processing continues to block 610. In block 610, in response to determining that no scan is running at this time, then the destaging system 232 starts a scan of cache to destage pinned retryable data that has become destageable by proceeding to block 700 of FIG. 7A.

Figure 7A:
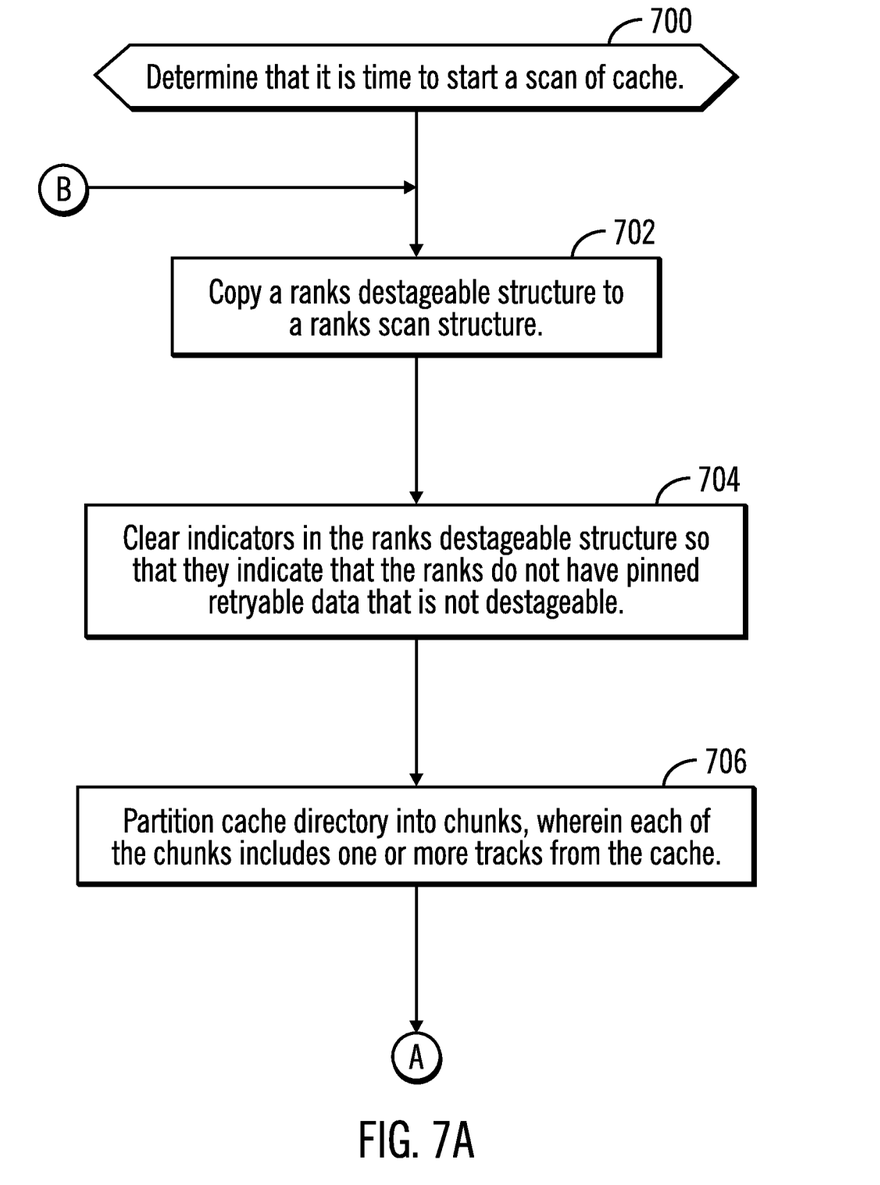
FIGS. 7A and 7B illustrate, in a flowchart, operations for scanning a cache in accordance with certain embodiments.
Figure 7B:
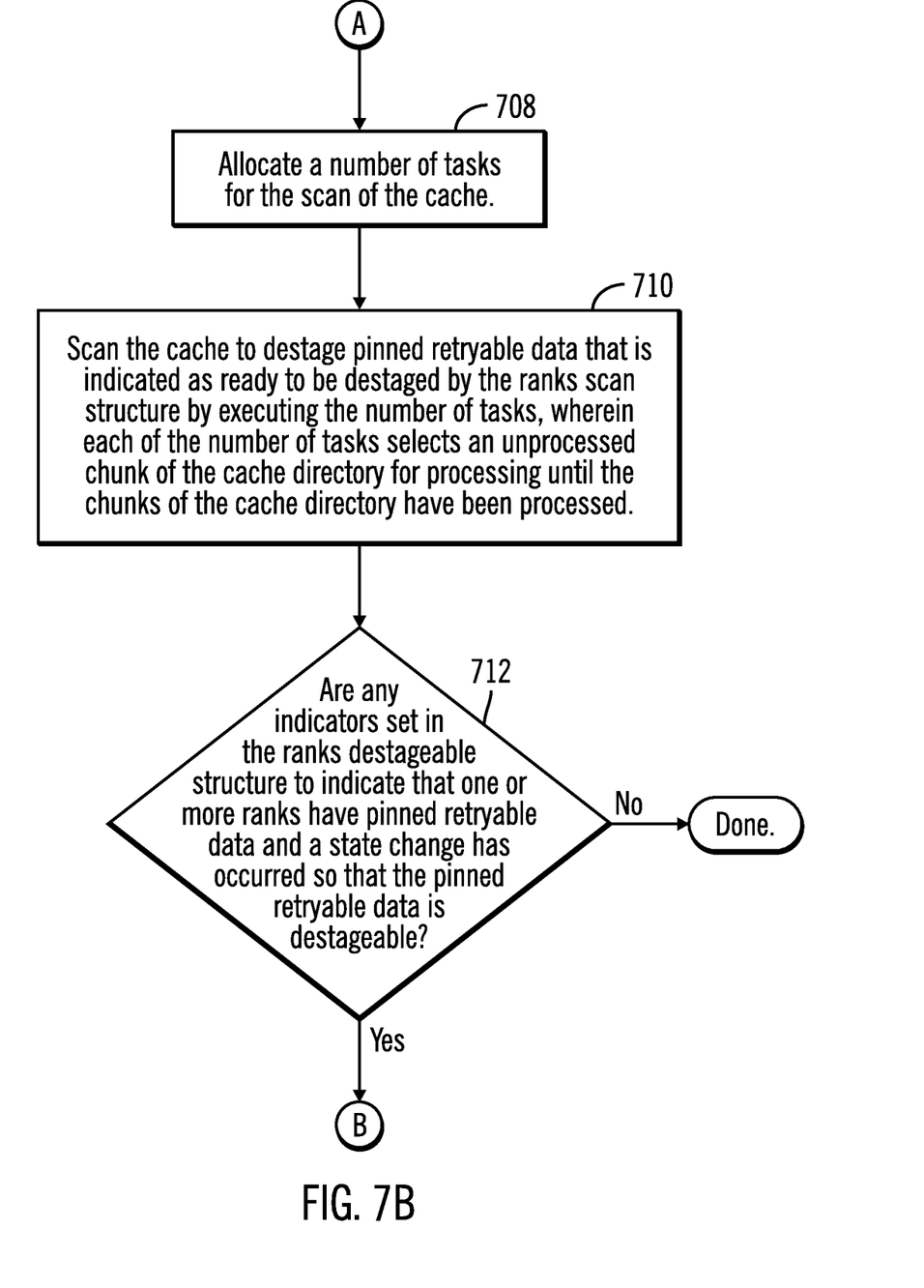

FIGS. 7A and 7B illustrates, in a flowchart, operations for scanning a cache in accordance with certain embodiments. Control begins at block 700 with the destaging system 232 determining that it is time to start a scan of cache to destage pinned retryable data that may now be destaged. This processing occurs when a scan is started in block 610 of FIG. 6.

In block 702, the destaging system 232 copies a ranks destageable structure 242 to a ranks scan structure 244. In block 704, the destaging system 232 clears indicators in the ranks destageable structure 242 so that they indicate that the ranks do not have pinned retryable data that is not destageable.

With embodiments, the destaging system 232 copies indicators of a bitmapRanksPinnedDataDestagable into a new bitmap of bitmapRanksRunningScan and clears the bits in the bitmapRanksPinnedDataDestagable.

In block 706, the destaging system 232 partitions a cache directory 246 into chunks, wherein each of the chunks includes one or more tracks from a cache. With embodiments, they are equal sized chunks. However, in other embodiments, the chunks may be of different sizes. From block 706 (FIG. 7A), processing continues to block 708 (FIG. 7B).

In block 708, the destaging system 232 determines (allocates) a number of tasks for the scan of the cache.

With embodiments, there are N predetermined number of tasks, and N is determined as follows:

1) Compute a constant X based on a number of processors (e.g., X=Number of Processors/16, so that if the storage controller has 32 processors, then X is 2).

2) Set N to 0.

3) For every rank that has an indicator set in the ranks scan structure 244 to indicate that pinned retryable data for that rank is destageable, add X*RankWeight to N. The rank weight (RankWeight) is determined by the type and/or speed of the rank (i.e., rank type and/or rank speed). For example, slower ranks have less weight and faster ranks have higher weight. For example, spinning ranks (7K, 10K, 15K RPM) have a weight of 1, Solid State Drives (SSDs) have a weight of 2, low speed flash drives have a weight of 3, high speed flash drives have a weight of 4.

In block 710, the destaging system 232 scans the cache to destage pinned retryable data by executing the number of tasks, which each select an unprocessed chunk of the cache directory 246 until the chunks of the cache directory 246 have been processed. That is, as long as chunks are available, each task grabs a chunk of the cache directory 246 and starts destaging tracks that are pinned and may be destaged. In particular, if a track is pinned and the rank that the track should be destaged to has its indicator set in the ranks scan structure 244 to indicate that the track's data is destageable, the destaging system 232 starts a destage on the track. If the destage fails, then the track is pinned again, and the scan moves to a next track in the cache directory 246. Once a task completes processing a chunk of the cache directory 246, the task obtains another chunk and so on until all chunks have been processed.

In block 712, the destaging system 232 determines whether there are any indicators set in the ranks destageable structure 242 to indicate that one or more ranks have pinned retryable data and a state change has occurred so that the pinned retryable data is destageable. If so, processing continues to block 702 (FIG. 7A), otherwise, processing is finished.

Thus, once all chunks are processed, the scan is finished. With embodiments, when the scan is finished, the destaging system 232 looks at the bitmapRanksPinnedDataDestagable and, if there are bits set, then the destaging system 232 starts another scan.

With embodiments, advantageously, appropriate tasks are running to remove pinned retryable data while not causing stress on the backend. Also, the destaging system 232 does not start too many scans at the same time, which advantageously avoids causing the storage controller to run out of processing capability.

Thus, with embodiments, when storage is filled and extents to be destaged are pinned in cache for retry when space opens up, the destaging system 232 uses the ranks destageable structure 242 covering the cache to mark the pinned retryable data. Then, the destaging system 232 runs a single scan of the storage with multiple tasks to cover the various types of storage and weights the allocation (for example by rank type and/or rank speed and by number of processes) and destages by chunks of the cache directory 246.

The reference characters used herein, such as n, m, and p are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
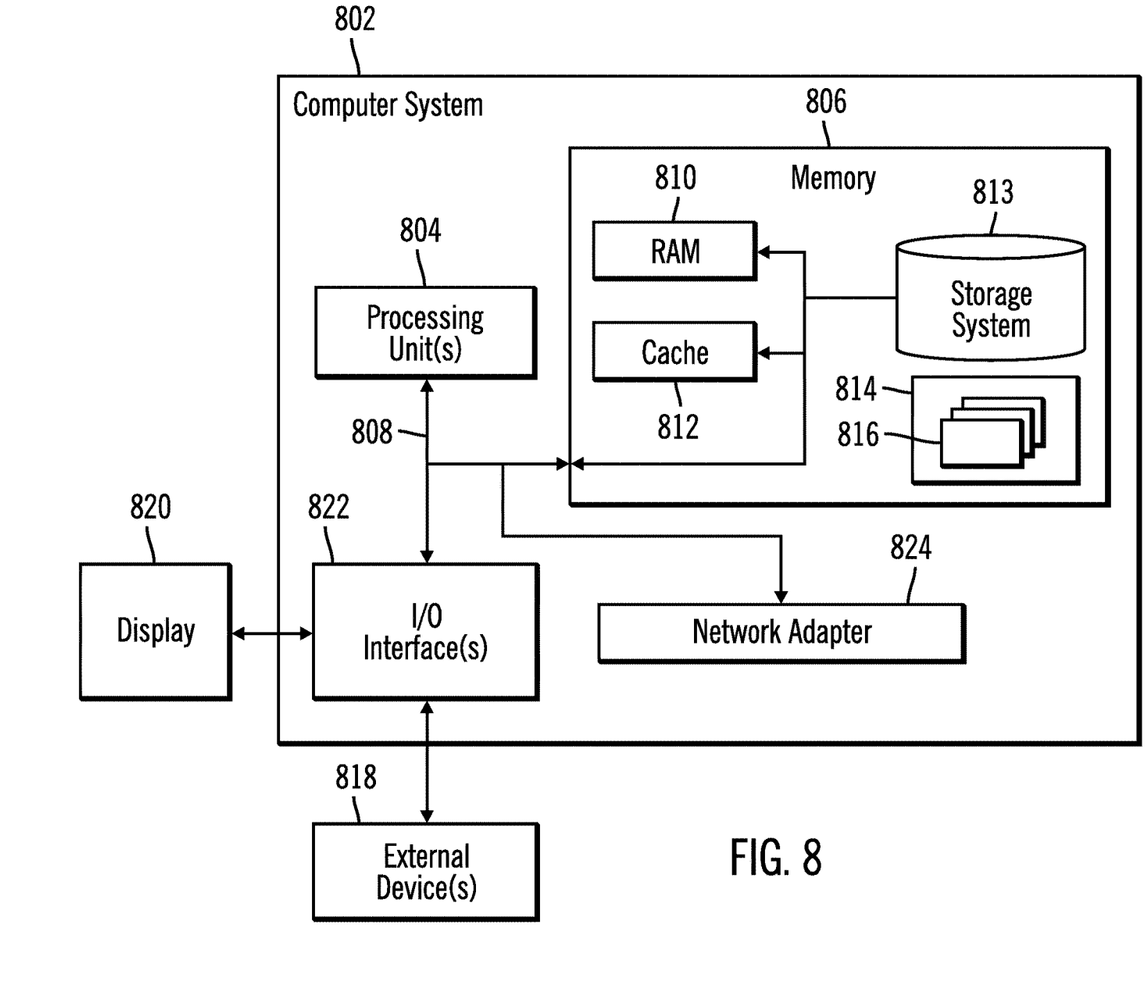
FIG. 8 illustrates a computing architecture in which the components of FIG. 1 may be implemented in accordance with certain embodiments.

FIG. 8 illustrates a computing architecture in which the components of FIG. 1 may be implemented in accordance with certain embodiments. The computational components of FIG. 1, including the hosts 100a, 100b, . . . 100n and the storage controller 120, may implement computer architecture 802. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform:
    creating a ranks destageable structure with an indicator for each rank of multiple ranks that indicates whether pinned retryable data for that rank is destageable;
    in response to receiving a notification that a rank of the multiple ranks has transitioned from a non-destageable state to a destageable state, determining that it is time to update the ranks destageable structure;
    for each rank of the multiple ranks, in response to determining that the rank has pinned retryable data and that the pinned retryable data is destageable, setting the indicator for the rank in the ranks destageable structure to indicate that the pinned retryable data for the rank is destageable; and
    starting a scan of a cache to destage the pinned retryable data that has become destageable.

2. The computer program product of claim 1, wherein the program code is executable by the at least one processor to perform:
    creating a ranks scan structure by making a copy of the ranks destageable structure;
    partitioning a cache directory into chunks, wherein each of the chunks includes one or more tracks from the cache;
    determining a number of tasks for a scan of the cache; and
    executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

3. The computer program product of claim 2, wherein the program code is executable by the at least one processor to perform:
    determining the number of tasks based on any of a number of processors of a storage controller, a type of each of the multiple ranks, a speed of each of the multiple ranks and a number of the multiple ranks.

4. The computer program product of claim 3, wherein the number of tasks is adjusted based on weights assigned to each of the ranks that has an indicator set in the ranks scan structure to indicate that pinned retryable data for that rank is destageable.

5. The computer program product of claim 1, wherein the program code is executable by the at least one processor to perform:
    in response to the scan completing and determining that there is an indicator set in the ranks destageable structure to indicate that another rank has pinned retryable data and the pinned retryable data is destageable, starting another scan.

6. The computer program product of claim 1, wherein the scan is started in response to determining that no scan is running.

7. The computer program product of claim 1, wherein the program code is executable by the at least one processor to perform:
    in response to creating the ranks destageable structure, clearing each indicator in the ranks destageable structure to indicate that a corresponding rank does not have pinned retryable data that is not destageable.

8. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    creating a ranks destageable structure with an indicator for each rank of multiple ranks that indicates whether pinned retryable data for that rank is destageable;
    in response to receiving a notification that a rank of the multiple ranks has transitioned from a non-destageable state to a destageable state, determining that it is time to update the ranks destageable structure;
    for each rank of the multiple ranks, in response to determining that the rank has pinned retryable data and that the pinned retryable data is destageable, setting the indicator for the rank in the ranks destageable structure to indicate that the pinned retryable data for the rank is destageable; and
    starting a scan of a cache to destage the pinned retryable data that has become destageable.

9. The computer system of claim 8, wherein the operations further comprise:
    creating a ranks scan structure by making a copy of the ranks destageable structure;
    partitioning a cache directory into chunks, wherein each of the chunks includes one or more tracks from the cache;
    determining a number of tasks for a scan of the cache; and
    executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

10. The computer system of claim 9, wherein the operations further comprise:
    determining the number of tasks based on any of a number of processors of a storage controller, a type of each of the multiple ranks, a speed of each of the multiple ranks and a number of the multiple ranks.

11. The computer system of claim 10, wherein the number of tasks is adjusted based on weights assigned to each of the ranks that has an indicator set in the ranks scan structure to indicate that pinned retryable data for that rank is destageable.

12. The computer system of claim 8, wherein the operations further comprise:
in response to the scan completing and determining that there is an indicator set in the ranks destageable structure to indicate that another rank has pinned retryable data and the pinned retryable data is destageable, starting another scan.

13. The computer system of claim 8, wherein the scan is started in response to determining that no scan is running.

14. The computer system of claim 8, wherein the operations further comprise:
in response to creating the ranks destageable structure, clearing each indicator in the ranks destageable structure to indicate that a corresponding rank does not have pinned retryable data that is not destageable.

15. A computer-implemented method, comprising:
creating a ranks destageable structure with an indicator for each rank of multiple ranks that indicates whether pinned retryable data for that rank is destageable;
in response to receiving a notification that a rank of the multiple ranks has transitioned from a non-destageable state to a destageable state, determining that it is time to update the ranks destageable structure;
for each rank of the multiple ranks, in response to determining that the rank has pinned retryable data and that the pinned retryable data is destageable, setting the indicator for the rank in the ranks destageable structure to indicate that the pinned retryable data for the rank is destageable; and
starting a scan of a cache to destage the pinned retryable data that has become destageable.

16. The computer-implemented method of claim 15, further comprising:
creating a ranks scan structure by making a copy of the ranks destageable structure;
partitioning a cache directory into chunks, wherein each of the chunks includes one or more tracks from the cache;
determining a number of tasks for a scan of the cache; and
executing the number of tasks to scan the cache to destage pinned retryable data that is indicated as ready to be destaged by the ranks scan structure, wherein each of the tasks selects an unprocessed chunk of the cache directory for processing until the chunks of the cache directory have been processed.

17. The computer-implemented method of claim 16, further comprising:
determining the number of tasks based on any of a number of processors of a storage controller, a type of each of the multiple ranks, a speed of each of the multiple ranks and a number of the multiple ranks.

18. The computer-implemented method of claim 17, wherein the number of tasks is adjusted based on weights assigned to each of the ranks that has an indicator set in the ranks scan structure to indicate that pinned retryable data for that rank is destageable.

19. The computer-implemented method of claim 15, further comprising:
in response to the scan completing and determining that there is an indicator set in the ranks destageable structure to indicate that another rank has pinned retryable data and the pinned retryable data is destageable, starting another scan.

20. The computer-implemented method of claim 15, wherein the scan is started in response to determining that no scan is running.

* * * * *